(12) United States Patent
Chiku et al.

(10) Patent No.: US 6,226,270 B1
(45) Date of Patent: May 1, 2001

(54) METHOD AND APPARATUS FOR PATH TRACE CHECK

(75) Inventors: Isao Chiku; Toru Kosugi; Yoshihiro Yatagai, all of Yokohama; Yoshitaka Taki, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/122,412

(22) Filed: Jul. 24, 1998

(30) Foreign Application Priority Data

Mar. 16, 1998 (JP) .................................. 10-065030

(51) Int. Cl.$^7$ .................................................. H04L 12/57
(52) U.S. Cl. .............................................................. 370/248
(58) Field of Search ..................................... 370/241, 242, 370/245, 248, 252; 359/110, 118, 119

(56) References Cited

U.S. PATENT DOCUMENTS 5,675,578 * 10/1997 Gruber et al. ...................... 370/248
5,721,727 * 2/1998 Ashi et al. .......................... 370/244
5,757,768 * 5/1998 Goto et al. .......................... 370/222
6,078,596 * 6/2000 Wellbrock ........................... 370/907

FOREIGN PATENT DOCUMENTS 411155   4/1992   (JP) .................................. H04J/3/00

* cited by examiner

Primary Examiner—Ricky Ngo
(74) Attorney, Agent, or Firm—Helfgott & Karas, P.C.

(57) ABSTRACT

A method for a path trace check reducing a load on a computer, raising the speed of the check, and easily enabling an increase of nodes to be added. On a sender side, a first computer simply generates path trace data, adds a specific code CR to this, multiplexes this to the transmission data, then transmits the same to a transmission line. On a receiver side, a second computer simply generates an expected value of the path trace data, autonomously compares this expected value and the actual path trace data extracted from the received transmission data by using the specific code, and determines coincidence of the two.

16 Claims, 15 Drawing Sheets

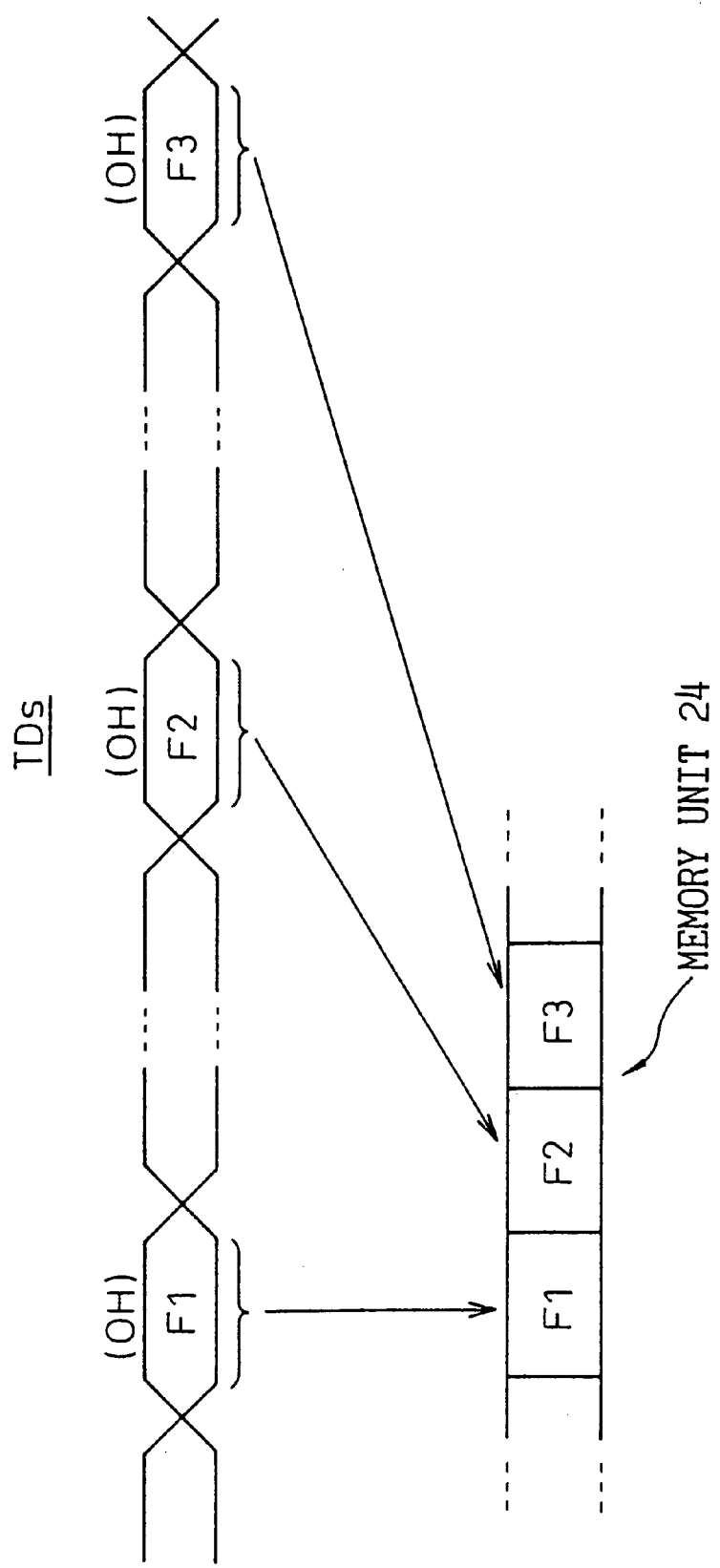

METHOD AND APPARATUS FOR PATH TRACE CHECK

BACKGROUND OF THE INVENTION

1. Field of the Invention

The present invention relates to a method and apparatus for a path trace check.

In a digital synchronization network, multiplex transmission data multiplexed by multiplex conversion equipment is transferred over a fiber transmission path connecting a plurality of nodes in a ring. In each of the nodes, required data is dropped from the multiplex transmission data or the required data is added to the multiplex transmission data.

The transmission data is multiplexed by for example the STS-1, VT1.5, or other prescribed frame format and, at the same time, given overhead data for transfer control or transfer management for each frame format data. Various types of transfer control information and transfer management information are contained in this overhead data. Among them, there is path trace data. The present invention relates to a path trace check using this path trace data.

Note that this path trace data is generally transferred using the J1 byte used in for example STS-1 multiplex transmission data or the J2 byte used in the VT1.5 multiplex transmission data. These path trace data (J1, J2, etc.) are for indicating through which path in the network the multiplex transmission data containing the related path trace data was transmitted. By analyzing this path trace data at the receiver side, the channel quality such as the error rate of the related path, can be determined.

2. Description of the Related Art

As will be explained in detail later by using the drawings, a path trace check apparatus of sender side ($PT_s$) and a path trace check apparatus of receiver side ($PT_r$) are formed in a multiplex conversion apparatus (MUX) in the related art. Each of these apparatuses is equipped internally with a microcomputer ($\mu$-COM) explained in detail later. The path trace check apparatus of the receiver side ($PT_r$) is further equipped with a synchronizing unit explained later. Such a path trace check apparatus suffers from the following problems.

First, when viewing the path trace check apparatus ($PT_s$) of the sender side PTs, there is a first problem that the microcomputer ($\mu$-COM) directly handles the transmission of frame bits so the load applied to the microcomputer becomes large.

Further, when viewing the path trace check apparatus PT of the receiver side ($PT_r$), there is a second problem that the microcomputer ($\mu$-COM) directly handles the processing for extraction of the path trace data so the load applied to the microcomputer becomes large in the same way as the above case.

Further, the path trace check apparatus PT of the receiver side ($PT_r$) of the related art is configured so that the synchronizing unit extracts the path trace data. Namely, it is based on a frame synchronization system. For this reason, the following third, fourth, and fifth problems arise.

Usually, a considerably long time is required for establishing synchronization in the case of frame synchronization. For this reason, a considerably long time is taken until the microcomputer extracts the path trace data and finishes deciding on the state of the channels. This is the third problem.

In this case, the cycle of appearance of the overhead OH (path overhead) is for example a slow one of 4 kHz. A considerably long time is therefore required until all path trace data is extracted. This is the fourth problem.

Further, networks NW are comprised of a large number of nodes and the number of the nodes will unquestionably increase in the future. If the number of nodes increases, with the frame synchronization method, it will be necessary to reset the timing due to the addition of the frame bits to be preassigned to each of the nodes. Namely, it will not be easy to cope with an increase of the number of nodes. This is the fifth problem.

SUMMARY OF THE INVENTION

Accordingly, in consideration of the above problems, an object of the present invention is to provide a method and apparatus for path trace control enabling a reduction of the load applied to the microcomputer, enabling quick determination of the state of the channels by the microcomputer, and in addition easily enabling an increase of the number of nodes to be added.

To attain the above object, according to a method of path trace check of the present invention, a first computer simply generates the path trace data at a sender side, adds a specific code (CR) to this, multiplexes this with the transmission data, then transmits the same to a transmission line. A second computer simply generates an expected value of the path trace data at a receiver side. The actual path trace data extracted from the received transmission data by using the specific code and the expected value are autonomously compared to determine coincidence.

By this, a path trace check method capable of reducing the load on the computer, raising the speed of the check, and easily coping with an increase of the nodes is realized.

BRIEF DESCRIPTION OF THE DRAWINGS

The above object and features of the present invention will be more apparent from the following description of the preferred embodiments given with reference to the accompanying drawings, wherein:

FIG. 15 is a waveform diagram of signals of major portions in FIG. 14.

DESCRIPTION OF THE PREFERRED EMBODIMENTS

Before describing the embodiments of the present invention, the related art and the disadvantages therein will be described with reference to the related figures.

Figure 12:
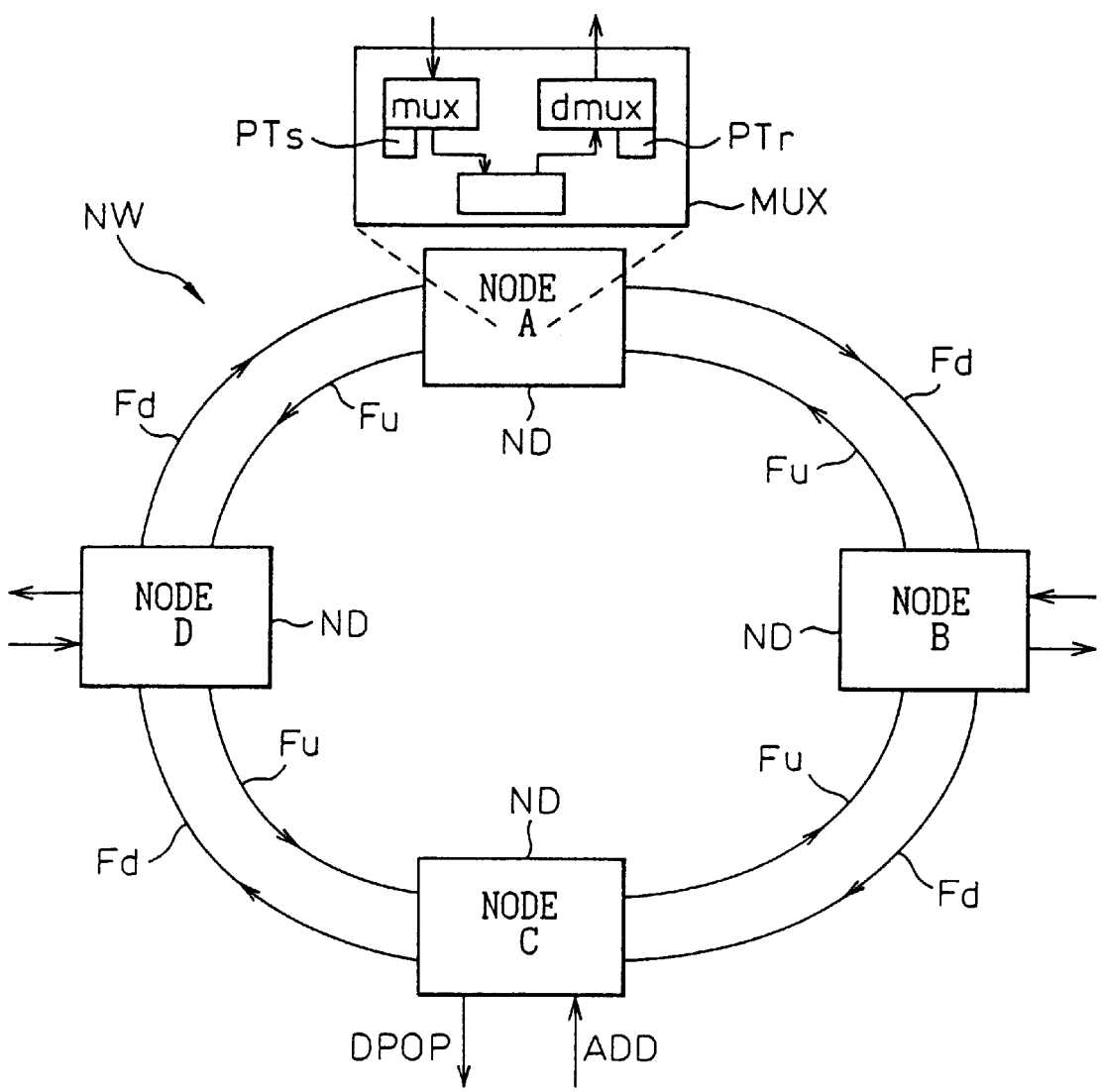
FIG. 12 is a view of an example of a network to which the present invention is applied.

FIG. 12 is a view of an example of a network to which the present invention is applied. In the figure, a network NW comprises a plurality of nodes ND (four nodes A, B, C, and D are shown for simplicity in the figure) and fiber transmission lines Fu and Fd (Fu is an upstream transmission line, and Fd is a downstream transmission line) connecting these nodes ND in a ring. Here, the main constituent element of each of the nodes ND is a multiplex conversion apparatus MUX connected to the subscribers accommodated by the nodes ND or LAN (not illustrated). In FIG. 12, for simplicity, only the multiplex conversion apparatus MUX in the node A is shown. This multiplex conversion apparatus MUX is constituted by an ADD side multiplexer unit (mux), a DROP side demultiplexer unit (dmux), electrical/optical (E/O) and optical/electrical (O/E) conversion units, etc. The present invention is applied to the multiplex conversion apparatus MUX.

Figure 13:
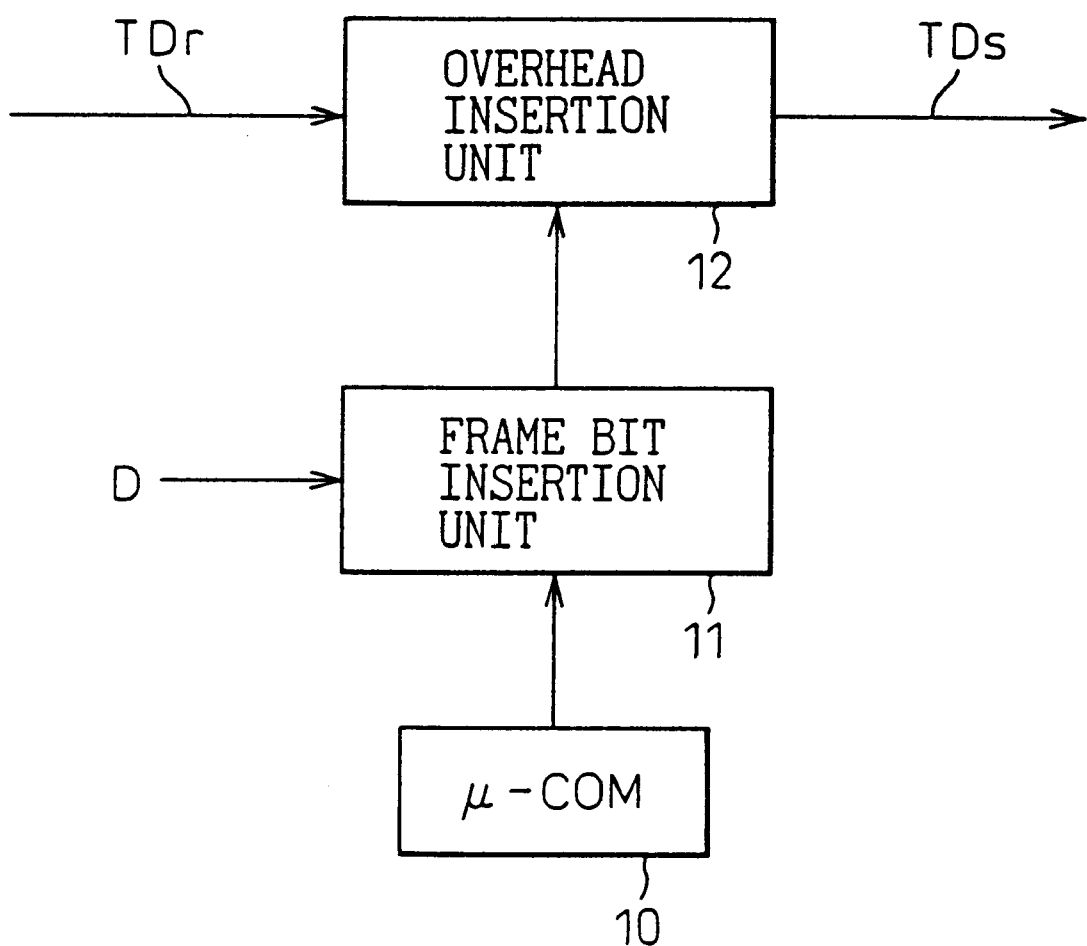
FIG. 13 is a schematic view of a path trace check apparatus of the sender side of the related art.

FIG. 13 is a schematic view of the path trace check apparatus of the sender side in the related art. This path trace check apparatus of the sender side is formed as shown by "PTs" in the multiplex conversion apparatus MUX of FIG. 12. "$PT_r$" shows the path trace check apparatus of the receiver side.

In FIG. 13, the address of the node in question is output as the frame bits (F) from the microcomputer ($\mu$-COM) 10. These frame bits are added to the transmission data D from the multiplexer unit mux in the node in question at a frame bit insertion unit 11. Further, an overhead insertion unit 12 inserts these frame bits into the overhead of the input received multiplex transmission data $TD_r$. The transmission data obtained by writing these frame bits into the overhead is transmitted to the node ND of the next stage as the sent multiplex transmission data $TD_s$.

Note that the microcomputer 10 is provided in for example a console in each node ND. The console is operated by an operator.

Figure 14:
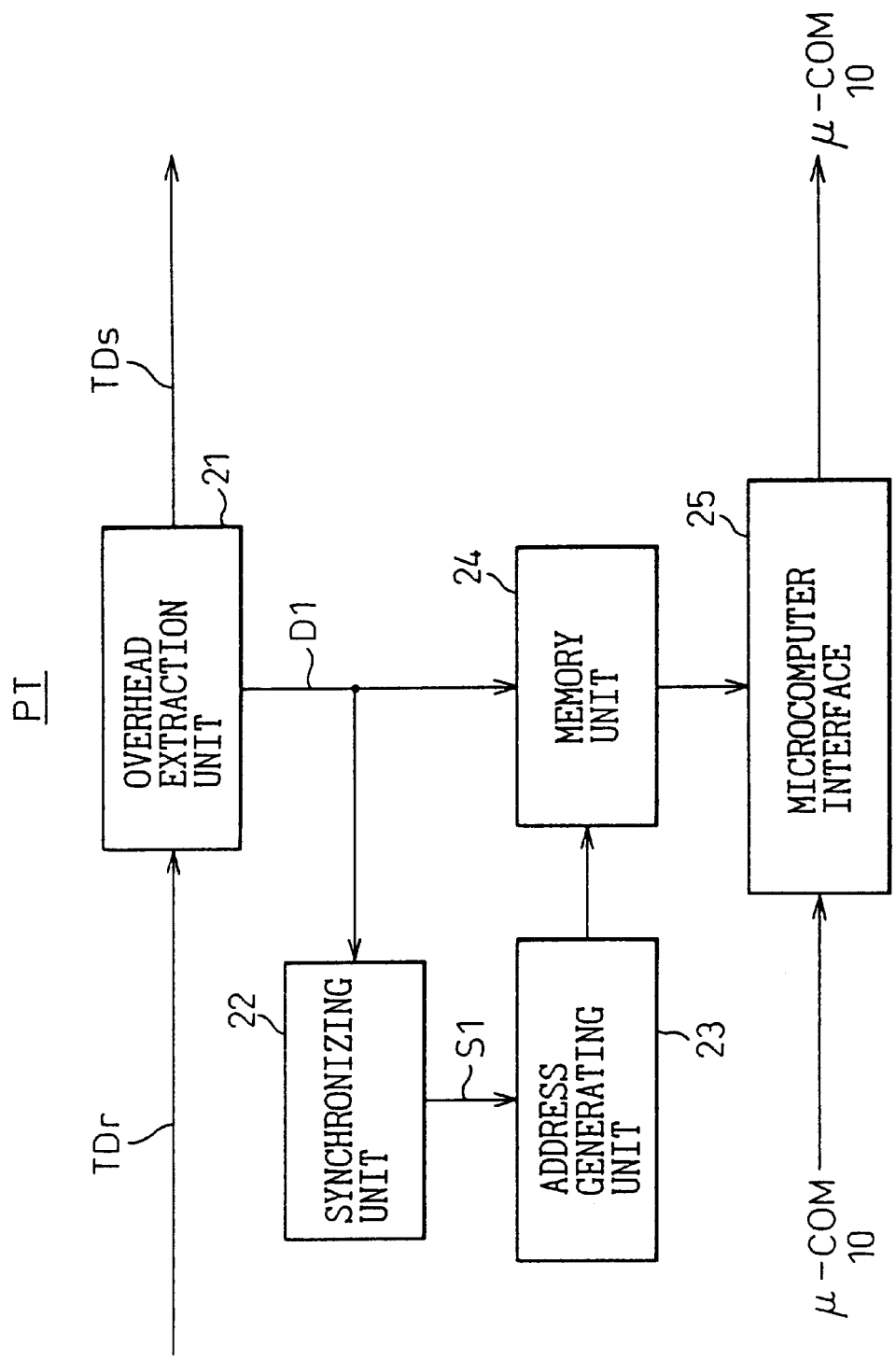
FIG. 14 is a schematic view of the path trace check apparatus of the receiver side of the related art.

FIG. 14 is a schematic view of the path trace check apparatus of the receiver side of the related art. Assume that the sent multiplex transmission data $TD_s$ (FIG. 13) is the multiplex transmission data from for example the node A. This multiplex transmission data is received by the path trace check apparatus of the receiver side ($PT_r$ of FIG. 13) of the next node B as the received multiplex transmission data $TD_r$.

As shown in FIG. 14, when the multiplex transmission data $TD_r$ is input to an overhead extraction unit 21, the overhead data is extracted from the transmission data $TD_r$ and transformed to path data by the unit 21. Further, only path trace data D1 is extracted from this path data.

The path trace data D1 is input to the synchronizing unit 22 on the one hand and input to a memory unit 24 on the other hand. The frame pattern is detected and frame synchronization established for the path trace data D1 input to the synchronizing unit 22. The "frame" here means a data frame for accommodating the frame bits mentioned above. The frame bits from the nodes ND are arranged in order for each frame.

A frame synchronization signal S1 from the synchronizing unit 22 is input to an address generating unit 23 of the next stage. An address is generated here on the basis of the frame synchronization signal S1.

The synchronizing unit 22 comprises a counter. The counter starts counting upon receipt of the frame synchronization signal S1. This count forms the address and functions as a path trace data detection pulse.

Namely, the path trace data detection pulse is applied to the memory unit 24, comprising for example a RAM, as the read address. The path trace data D1 written in the memory unit 24 is read according to this address.

The read path trace data D1 containing a plurality of above frame bits is processed by the microcomputer ($\mu$-COM) via a microcomputer interface 25. The left and right microcomputers shown in FIG. 14 are exactly the same. The microcomputer on the left side outputs a read request signal, while the microcomputer on the right side receives the path trace data in accordance with the request.

The microcomputer compares the expected value of the path trace data input by the operator and the actual path trace data read from the memory unit 24 by the above request to determine whether the trace paths match or not.

Looking at the expected value of the path trace data, in FIG. 12, for example, when the node ND(B) tries to check the channel quality of the multiplex transmission data from the node ND(C) due to deterioration of the channel quality, the expected value of the path trace data becomes the shortest path, that is C→B. However, if the actual path trace data read from the memory unit 24 is C→A→B, it can be deduced that the deterioration of the channel quality occurred due to a roundabout bypass path. In this case, it can be considered that the fault occurred in the fiber transmission line between the node ND(B) and the node ND(C).

FIG. 15 is a waveform diagram of signals of major portions in FIG. 14. The upper row shows the sent multiplex transmission data $D_s$ on the fiber transmission line. The data may be roughly classified into the overhead (OH) and the path data containing the audio, video, and other user transmission information.

For example, the previously mentioned frame bits are placed in each overhead OH as the frame bits F1, F2, F3, . . . Then, only these frame bits F1, F2, F3, . . . are read as the path trace data shown in the lower row of FIG. 15 from the memory unit 24 by the action of the overhead extraction unit 21, the synchronizing unit 22, and the address generating unit 23 of FIG. 14.

First, when viewing the path trace check apparatus of the sender side (PTs), there is the above mentioned first problem that the microcomputer ($\mu$-COM) 10 directly handles the transmission of frame bits so the load applied to the microcomputer 10 becomes large.

Further, when viewing the path trace check apparatus of the receiver side ($PT_r$), there is the above-mentioned second problem that the microcomputer ($\mu$-COM) 10 directly handles the processing for extraction of the path trace data so the load applied to the microcomputer 10 becomes large in the same way as the above case.

Further, as shown in FIG. 14, the path trace check apparatus of the receiver side ($PT_r$) of the related art is configured so that the synchronizing unit 22 extracts the path trace data. Namely, it is based on a frame synchronization system. For this reason, the above-mentioned following third, fourth, and fifth problems arise.

Usually, a considerably long time is required for establishing synchronization in the case of frame synchronization. For this reason, a considerably long time is taken until the microcomputer extracts the path trace data and finishes deciding on the state of the channels. This is the above-mentioned third problem.

In this case, referring to FIG. 15, the cycle of appearance of the overhead OH (path overhead) is for example a slow one of 4 kHz. A considerably long time is therefore required until all path trace data is extracted. This is the above-mentioned fourth problem.

Further, the network NW shown in FIG. 12 is shown with four nodes for simplicity sake, but the number of nodes is actually much greater. Further, the number of the nodes will unquestionably increase in the future. If the number of nodes increases, with the frame synchronization method, it will be necessary to reset the timing due to the addition of the frame bits preassigned to the nodes. Namely, it will not be easy to cope with an increase of the number of nodes. This is the above-mentioned fifth problem.

In consideration of the above problems, the present invention provides a method and apparatus for path trace control enabling a reduction of the load applied to the microcomputer, easily enabling quick determination of the state of the channels by the microcomputer, and in addition easily enabling an increase of the number of nodes to be added.

Figure 1:
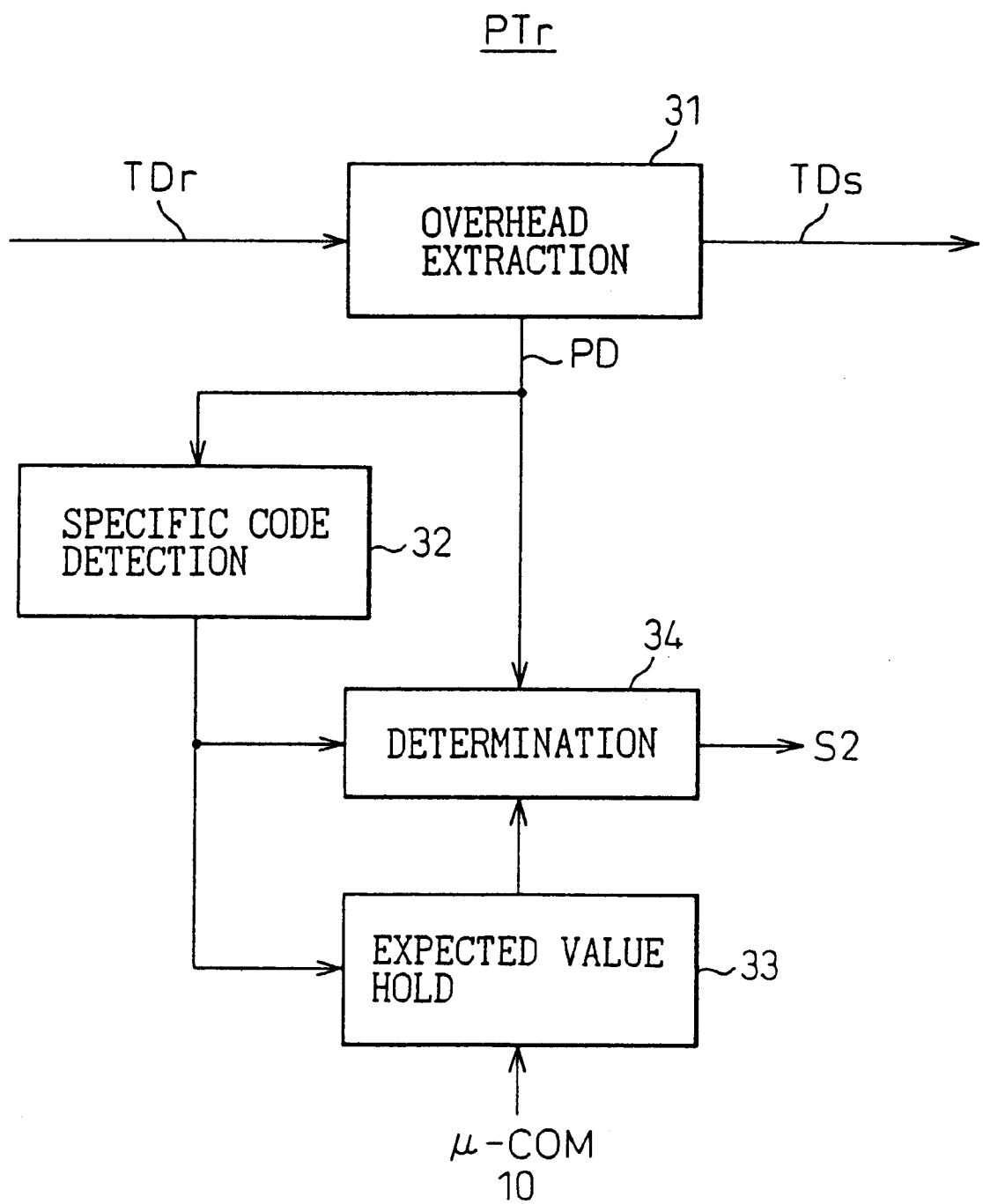
FIG. 1 is a view of the basic configuration of a path trace check apparatus (receiver side) according to the present invention.

FIG. 1 is a view of the basic configuration of a path trace check apparatus (receiver side) according to the present invention. As shown in the figure, the path trace apparatus of the receiver side ($PT_r$) according to the present invention comprises an overhead extracting means 31, a specific code detecting means 32, an expected value holding means 33, and a determining means 34.

The overhead extracting means 31 extracts the overhead data from the received multiplex transmission data and transforms this to the path data PD.

The specific code detecting means 32 detects the specific code placed in the path data PD.

The expected value holding means 33 holds, for a predetermined period, the expected value of the path trace data indicating the route of transfer of the multiplex transmission data designated from an external portion (for example, a microcomputer 10) at the timing of detection of the specific code.

The determining means 34 compares, according to the timing of detection of the specific code, each of the actual path trace data successively extracted from the path data PD and the expected value of the path trace data corresponding to each path trace data and determines coincidence between the two. In the figure, S2 is a coincidence determination signal.

Namely, the path trace check method (receiver side) of the present invention is comprised of the following first to fourth steps:

(i) First step: Extraction of the overhead data from the received multiplex transmission data and transformation of this to the path data PD.

(ii) Second step: Detection of the specific code placed in the path data PD.

(iii) Third step: Holding for a predetermined period the expected value of the path trace data indicating the route of transfer of the multiplex transmission data designated from the external portion ($\mu$-COM10) at the timing of detection of the specific code.

(iv) Fourth step: Comparison of each of the actual path trace data successively extracted from the path data PD and the expected value of the path trace data corresponding to each path trace data according to the timing of detection of the specific code and determination of coincidence between the two.

Figure 2:
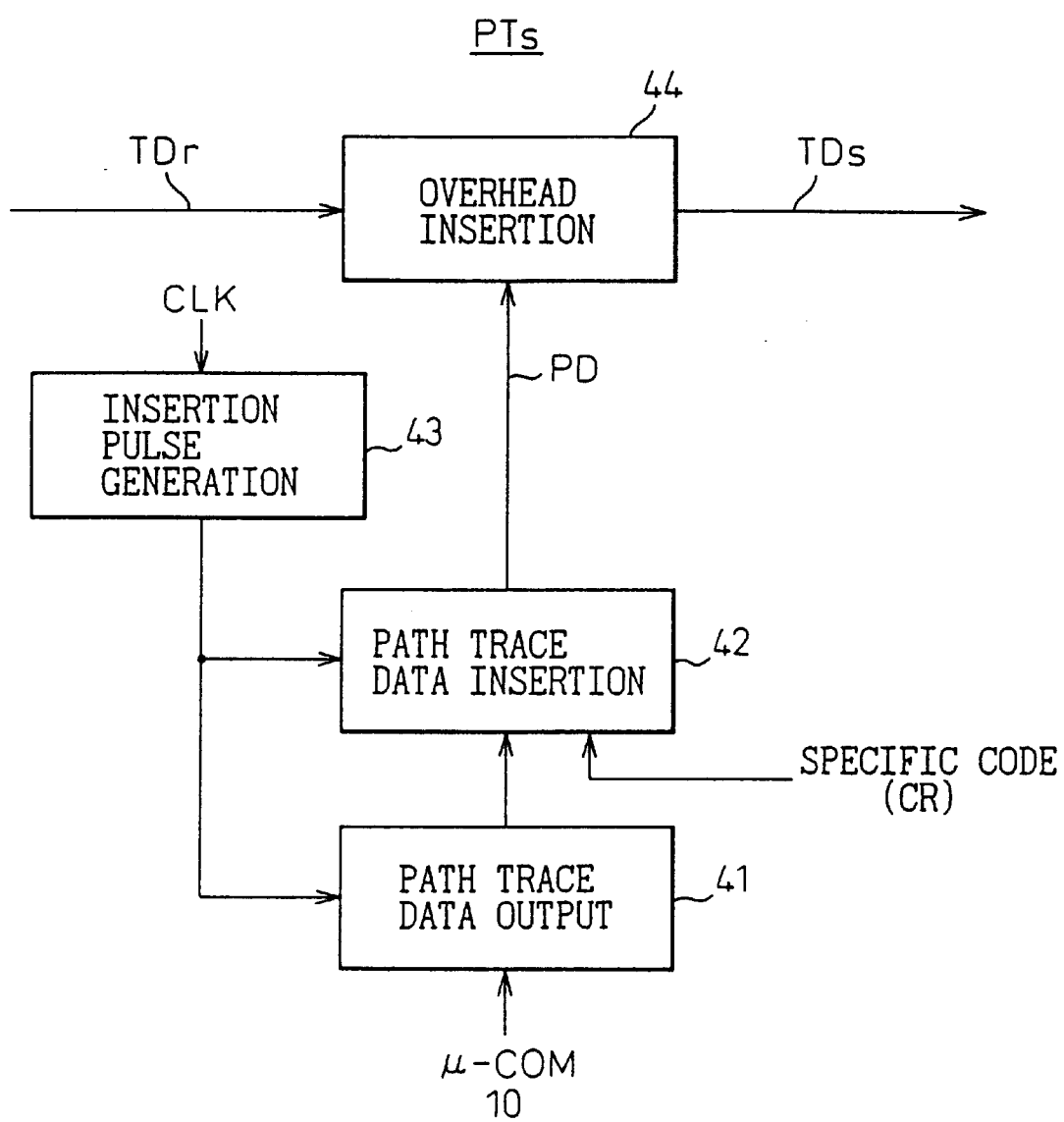
FIG. 2 is a view of the basic configuration of a path trace check apparatus (sender side) according to the present invention.

FIG. 2 is a view of the basic configuration of a path trace check apparatus (sender side) according to the present invention. As shown in the figure, the path trace check apparatus of the sender side ($PT_s$) according to the present invention comprises a path trace data outputting means 41, a path trace data inserting means 42, an insertion pulse generating means 43, and an overhead inserting means 44.

The path trace data outputting means 41 outputs an identification address of the path trace check apparatus in the network NW as the path trace data.

The path trace data inserting means 42 inserts the path trace data at a predetermined location in the path data to be transmitted to the network NW together with the specific code indicating at least the timing of start of the path trace data.

The insertion pulse generating means 43 generates a path trace data insertion pulse synchronized with the clock of the multiplex transmission data transferred in the network NW and applies this to the path trace data inserting means 42.

The overhead inserting means 44 places the specific code and the path trace data from the path trace data inserting means 42 in the path data PD and transmits the same to the network NW.

Namely, the path trace check method of the present invention (sender side) is constituted by the following first to fourth steps:

(i) First step: Output of the identification address of the related path trace check apparatus in the network NW as the path trace data.

(ii) Second step: Insertion of the path trace data at a predetermined location in the path data to be transmitted to the network NW together with the specific code indicating at least the timing of start of the path trace data.

(iii) Third step: Generation of the path trace data insertion pulse synchronized with the clock of the a multiplex transmission data transferred in the network NW in order to determine the predetermined location in the path data PD.

(iv) Fourth step: Placement of the specific code and the path trace data in the path data PD and transmission of the same to the network NW.

Note that, in the present invention, as to the specific code, a code which is defined in an international standard as a character code, but does not appear as the path data PD is selected. As a concrete example, the specific code is a carriage return code CR. As is well known, this carriage return code CR is a format control code defined in the standard ASCII Code and is for moving a printing or display position to the initial position of the same row.

Therefore, according to the present invention, by detecting the carriage return code CR (specific code) from the path data PD, it becomes possible to determine the position of the path trace data (identification address for confirming an opposing node) in the frame format. That is, a frame synchronization protocol as in the related art requiring a long time until establishment of synchronization is not adopted.

The expected value of the path trace data (node C→node B in the already explained example) given from the external portion (μ-COM 10) is compared with the actual path trace data at the determining means 34. If the two do not coincide (for example, node C→node D→node A→node B), it is determined that the related multiplex transmission data is not the data which passed through the original (planned) path from the related opposing node to reach this node B.

Further, it is sufficient for the microcomputer on sender side merely sends the expected value of the path trace data to the path trace data outputting means 41, and the load of the microcomputer becomes small.

Looking at the microcomputer on the receiver side, the microcomputer can autonomously obtain the coincidence determination signal S2 merely by giving the expected value of the path trace data to the expected value holding means 33, therefore the load of the microcomputer becomes small.

Furthermore, when there is an increase of the nodes, it is sufficient to just insert the path trace data for the related increased nodes into the overhead together with the carriage return code CR (specific code). This will be explained by referring to FIG. 3 and FIG. 4 discussed later.

Figure 3:
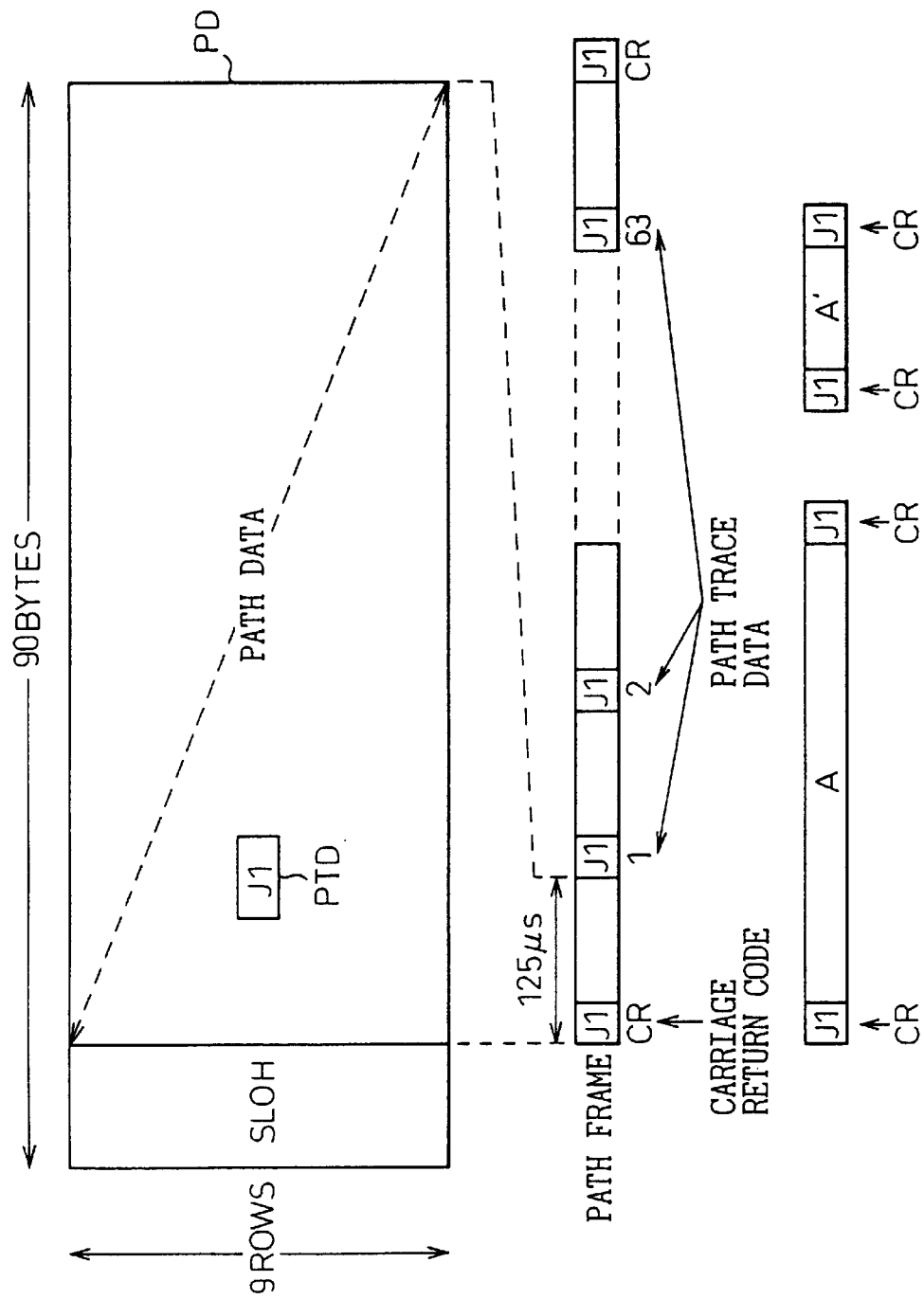
FIG. 3 is a schematic view of a first example of mapping of data based on the present invention.
Figure 4:
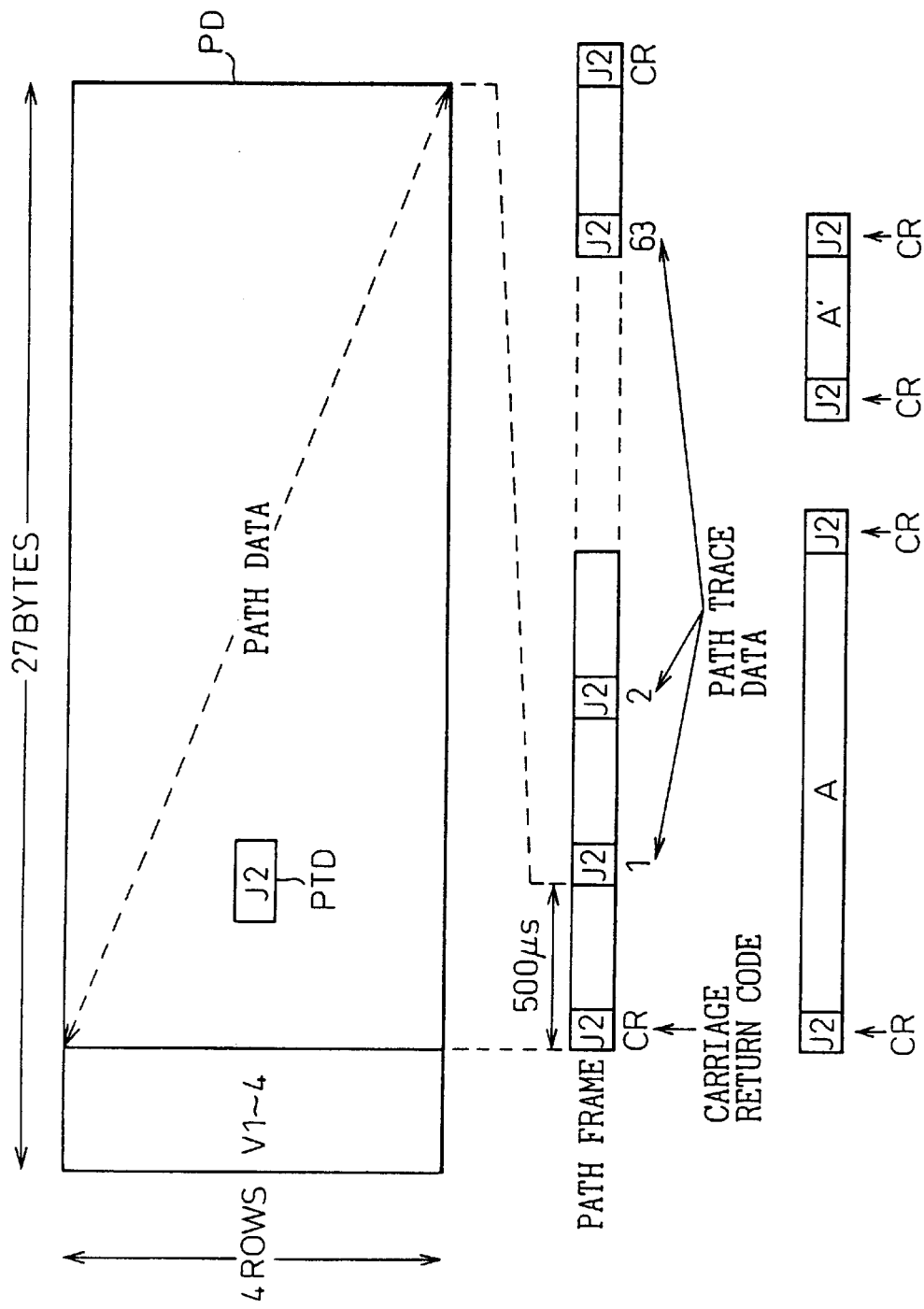
FIG. 4 is a schematic view of a second example of mapping of data based on the present invention.

FIG. 3 is a schematic view of a first example of mapping of data based on the present invention; and FIG. 4 is a schematic view of a second example of the mapping of data based on the present invention.

Specifically, FIG. 3 shows a path trace check method using the path trace data PTD as the J1 byte in the STS-1 frame format. On the other hand, FIG. 4 shows a path trace check method using the path trace data PTD as the J2 byte in the VT1.5 frame format.

The upper part of FIG. 3 shows one unit of the multiplex transmission data. This is comprised by the above path data PD and the section and line overhead SLOH. The above path trace data PTD is stored in the J1 byte in the path data PD. This one unit of the multiplex transmission data is comprised by 90 bytes×9 rows. Note that data indicating the location of the J1 byte is also contained in the SLOH.

The upper part of FIG. 4 similarly shows one unit of the multiplex transmission data. The path trace data PTD is stored in the J2 byte in the path data PD.

Referring to FIG. 3 again, the middle part shows one path frame. This is comprised of for example a series of 63 125 μs path data, each containing a J1 byte.

At the head of each path frame, the J1 byte stores the carriage return code CR (specific code) of the characteristic feature of the present invention. The path trace data indicating the identification address of the node is stored over the 1 to 63 bytes after this.

The characteristic feature of the present invention resides in that the path trace data can be inserted everywhere by using the carriage return code CR (specific code) as a flag. There is no waste. Further, when there is an increase in the nodes, the code CR may be simply added and the path trace data of the related increased node may be placed after this. The lower part of FIG. 3 shows this situation. In the lower part of FIG. 3, "A" shows the series of path trace data for the node A. Carriage return codes CR are added to the head and tail of the same.

On the other hand, "A'" shows the series of path trace data for the increased node A'. Carriage return codes CR are added to the head and the tail thereof.

Usually, it does not take all of the 63 bytes to transmit a series of path trace data for the node A, and thus, there are surplus bytes. Another advantage of the present invention is that the J1 byte can be utilized without waste by placing other path trace data on the surplus bytes.

The advantage similarly occurs in the case of FIG. 4 as well.

Figure 5:
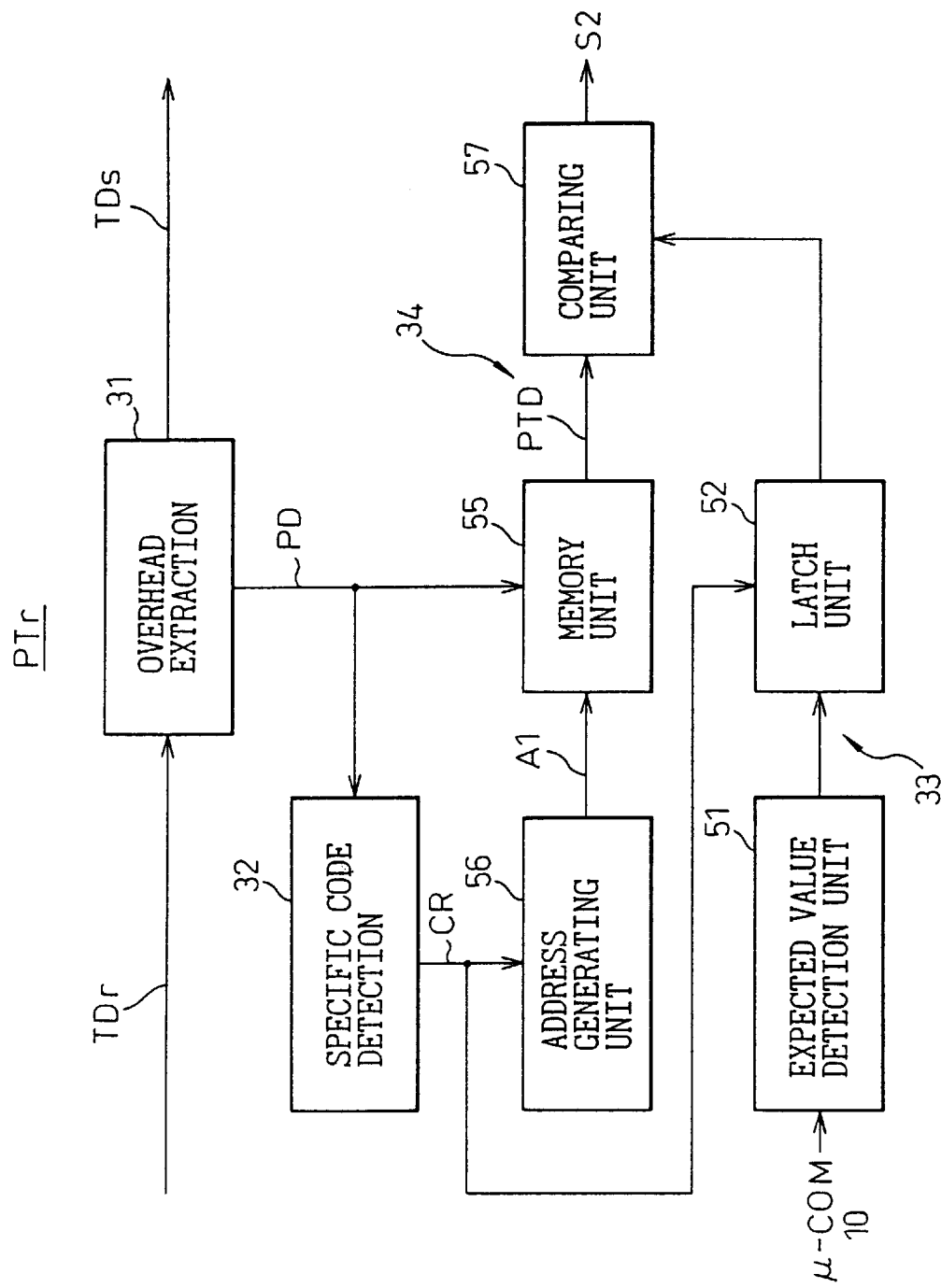
FIG. 5 is a view of a first embodiment of the path trace check apparatus (receiver side)

FIG. 5 is a view of a first embodiment of the path trace check apparatus (receiver side). Note that the same reference numerals and symbols are given to similar constituent elements throughout all of the drawings.

In the first embodiment, the expected value holding means 33 is further concretely shown in comparison with the configuration of FIG. 1. The determining means 34 is also shown in further detail.

Note that the path trace check methods of the first embodiment and the second embodiment explained later consist of the above path trace check method with slight changes to the first and fourth steps among the first to fourth steps.

Namely, the above first step is changed to further include a step of holding the transformed path data PD for a predetermined period. The above fourth step is changed to successively read the actual path trace data from the path data PD held for a predetermined period and compare the read outputs and the expected value of the path trace data respectively corresponding to them. This will be apparent from the configuration of the hardware shown in FIG. 5.

Referring to FIG. 5, first, the expected value holding means 33 is constituted by an expected value detection unit 51 and a latch unit 52.

The expected value detection unit 51 detects the expected value of the path trace data indicating the route of transfer of the related multiplex transmission data designated from the external portion (μ-COM 10). Further, the latch unit 52 holds the expected value of the path trace data detected by the expected value detection unit 51 at the timing of detection of the specific code (CR).

Looking at the determining means 34 next, this is constituted by a memory unit 55, an address generating unit 56, and a comparing unit 57.

The memory unit 55 is for writing the path data PD from the overhead extracting means 31.

The address generating unit 56 generates a read address A1 for successively reading the path trace data PTD from the path data PD written in the memory unit 55 according to the detection timing signal of a specific code (CR) from the specific code detecting means 32 and supplies this to the memory unit 55.

The comparing unit 57 detects coincidence between the path trace data PTD read from the memory unit 55 and the expected value of the path trace data output from the latch unit 52 and outputs a coincidence determination signal S2.

The memory unit 55 comprises for example a RAM. The path trace data PTD written one frame before is read by the address A1. The comparing unit 57 compares the read output with the expected value of the path trace data held for one frame at the latch unit 52. The result of the comparison is the signal S2. If this signal S2 indicates non-coincidence even one time, an alarm is sent to the microcomputer (μ-COM) 10.

Figure 6:
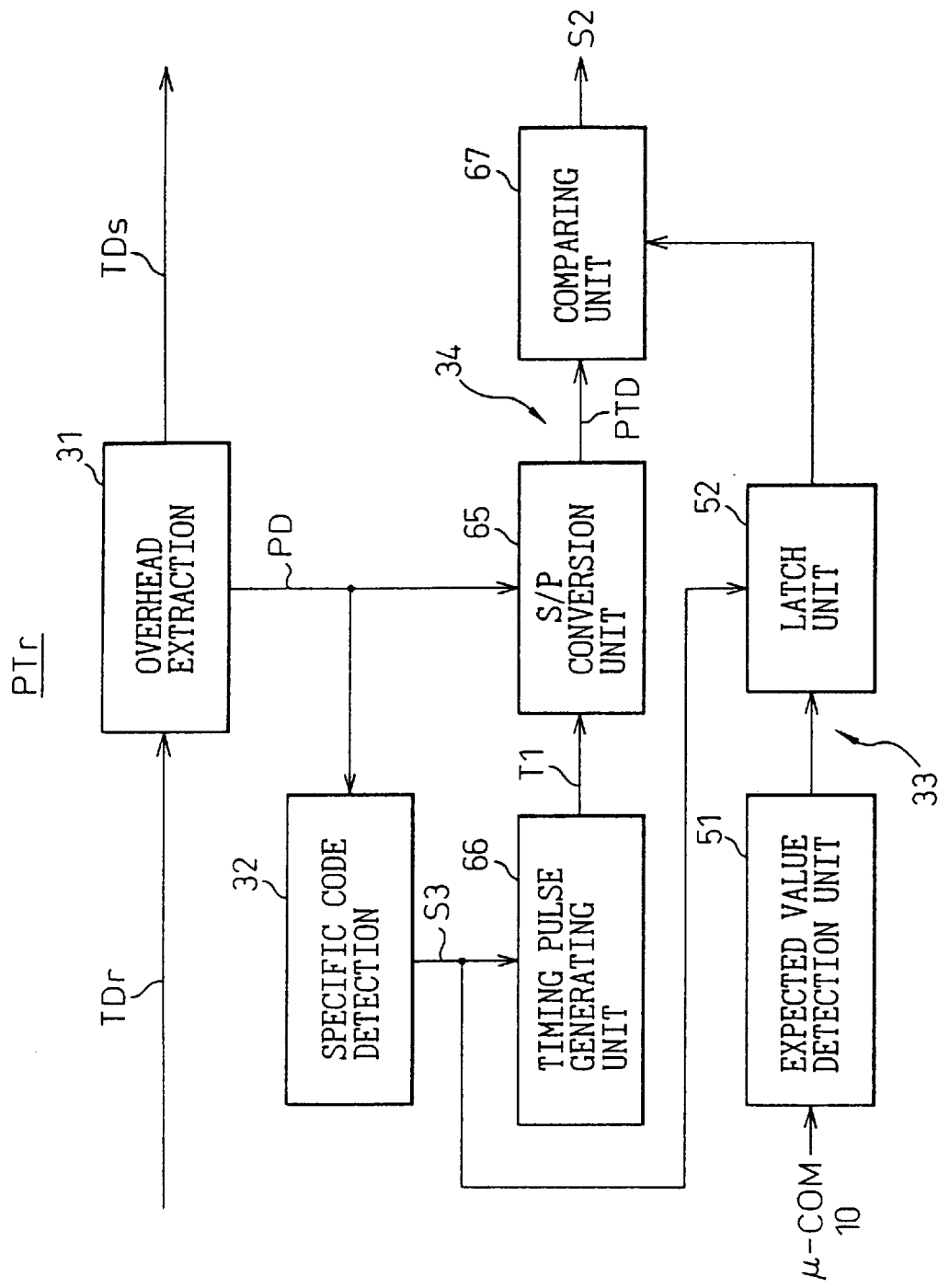
FIG. 6 is a view of a second embodiment of the path trace check apparatus (receiver side)

FIG. 6 is a view of a second embodiment of the path trace check apparatus (receiver side). In this second embodiment, in comparison with the configuration of FIG. 1, the determining means 34 is further concretely shown. Note that the concrete configuration of the expected value holding means 33 is the same as that of the case of the first embodiment.

Referring to FIG. 6, the determining means 34 is constituted by a serial/parallel (S/P) conversion unit 65, a timing pulse generating unit 66, and a comparing unit 67.

The serial/parallel (S/P) conversion unit 65 receives as its input the path data PD from the overhead extracting means 31.

The timing pulse generating unit 66 generates a timing pulse T1 for successively converting just the path trace data PTD in that PD from serial data to parallel data and holding the same for a predetermined period, and supplies the same to the serial/parallel conversion unit 65, which path data PD is input to the serial/parallel conversion unit 65 according to the detection timing signal S3 of the specific code (CR) from the specific code detecting means 32.

The comparing unit 67 detects coincidence between each path trace data PTD output from the serial/ parallel conversion unit 65 and the expected value of each path trace data output from the latch unit 52 and outputs the coincidence determination signal S2.

The serial/parallel conversion unit 65 functions to extending the path trace data extracted by the timing pulse T1 and holding the same for a predetermined period. The timing pulse generating unit 66 for generating this timing pulse T1 can be constituted by for example a counter. This counter starts counting by the detection timing signal S3 and samples only the part of the path trace data from among the path data PD by this count output.

Figure 7:
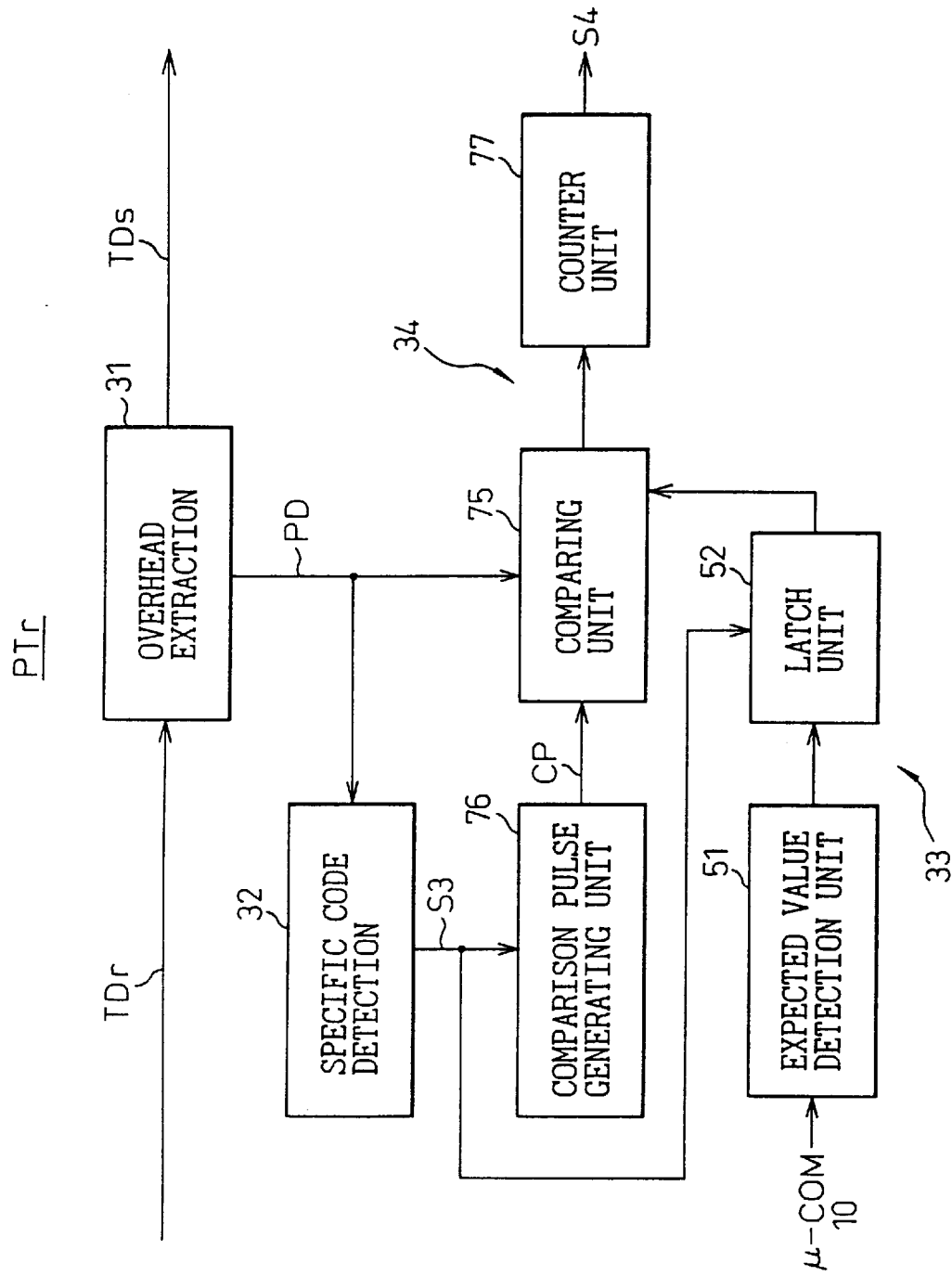
FIG. 7 is a view of a third embodiment of the path trace check apparatus (receiver side)

FIG. 7 is a view of a third embodiment of the path trace check apparatus (receiver side). In this third embodiment, in comparison with the configuration of FIG. 1, the determining means 34 is further concretely shown. Note that the concrete configuration of the expected value holding means 33 is the same as that of the cases of the first and second embodiments.

Referring to FIG. 7, the determining means 34 is constituted by a comparing unit 75, a comparison pulse generating unit 76, and a counter unit 77.

The comparing unit 75 receives the expected value of each path trace data output from the latch unit 52 as the first comparison input and then receives as input the path data PD from the overhead extracting means 31.

The comparison pulse generating unit 76 generates a comparison pulse CP for selecting just each path trace data PTD from the path data PD input, as the second comparison input, to the comparing unit 75 according to the detection timing signal S3 of the specific code (CR) from the specific code detecting means 32 and supplies the same to the comparing unit 75.

The counter unit 77 monitors the continuity of coincidences of the two based on the result by successively comparing the first and second comparison inputs with each comparison pulse CP. S4 is the monitor signal.

The counter unit 77 is constituted by for example an N-sequence counter. The monitor signal S4 becomes "1" (normal) only when the actual path trace data and the expected value of the path trace data coincide continuously N number of times. N is equal to for example 63. When the monitor signal S4 is "0", an alarm is sent to the microcomputer ($\mu$-COM) 10.

Figure 8:
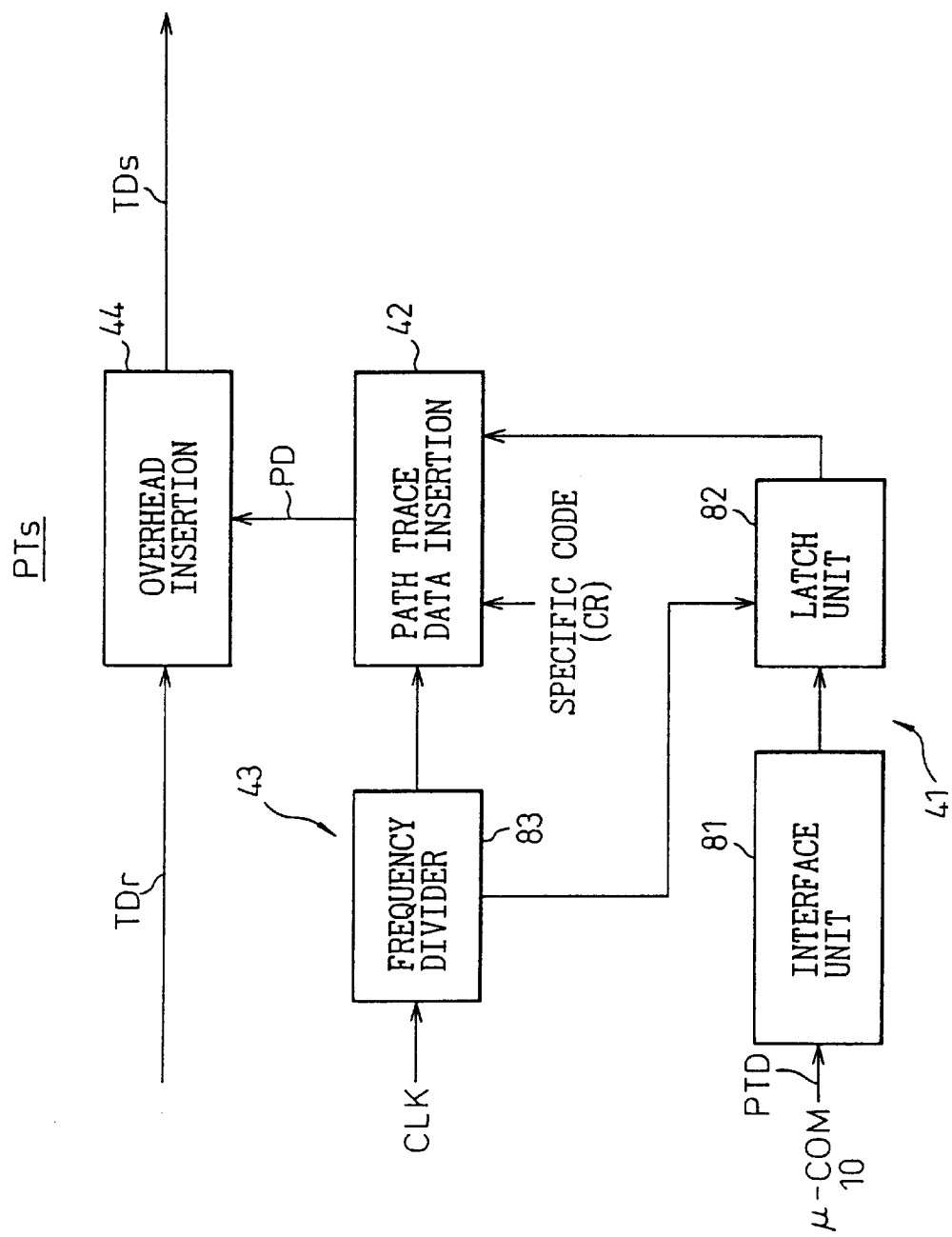
FIG. 8 is a view of an embodiment of the path trace check apparatus (sender side)

FIG. 8 is a view of an embodiment of the path trace check apparatus (sender side) and shows the basic configuration shown in FIG. 2 in more detail.

The path trace data outputting means 41 (FIG. 2) comprises an interface unit 81 for detecting the path trace data PTD from the microcomputer ($\mu$-COM) 10 and a latch unit 82 for holding the detection output from the interface unit 81 for a predetermined period.

Further, the insertion pulse generating means 43 (FIG. 2) comprises a frequency divider 83 for dividing the frequency of the clock CLK synchronized with the clock of the multiplex transmission data and drives the latch unit 82 by the output of the frequency divider 83. Namely, it holds the path trace data PTD from the interface unit 81 for a predetermined period.

The clock CLK obtained by dividing the frequency of the clock of the multiplex transmission data is a divided clock of for example 10 Gbps. On the other hand, the speed of the transmission data from subscribers or LAN to be input to the multiplex conversion apparatus MUX is for example 1.544 Mbps.

Thus, by inserting the carriage return code CR (specific code) into the path data, the header location of the path trace data can be easily and quickly determined at the path trace check apparatus of the receiver side $PT_r$.

Figure 9:
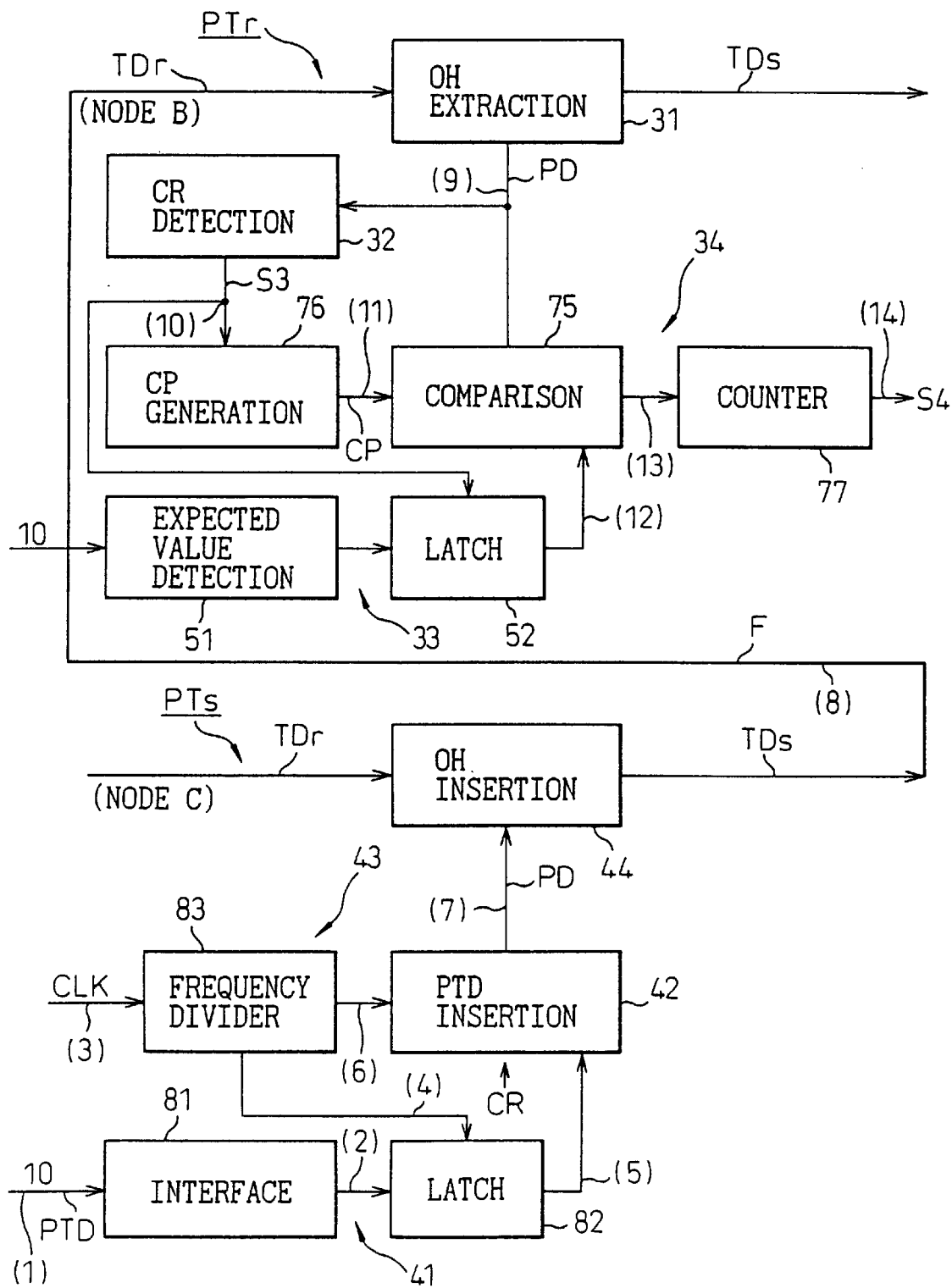
FIG. 9 is a view of a pair of a sender side path trace check apparatus and a receiver side path trace check apparatus.
Figure 10:
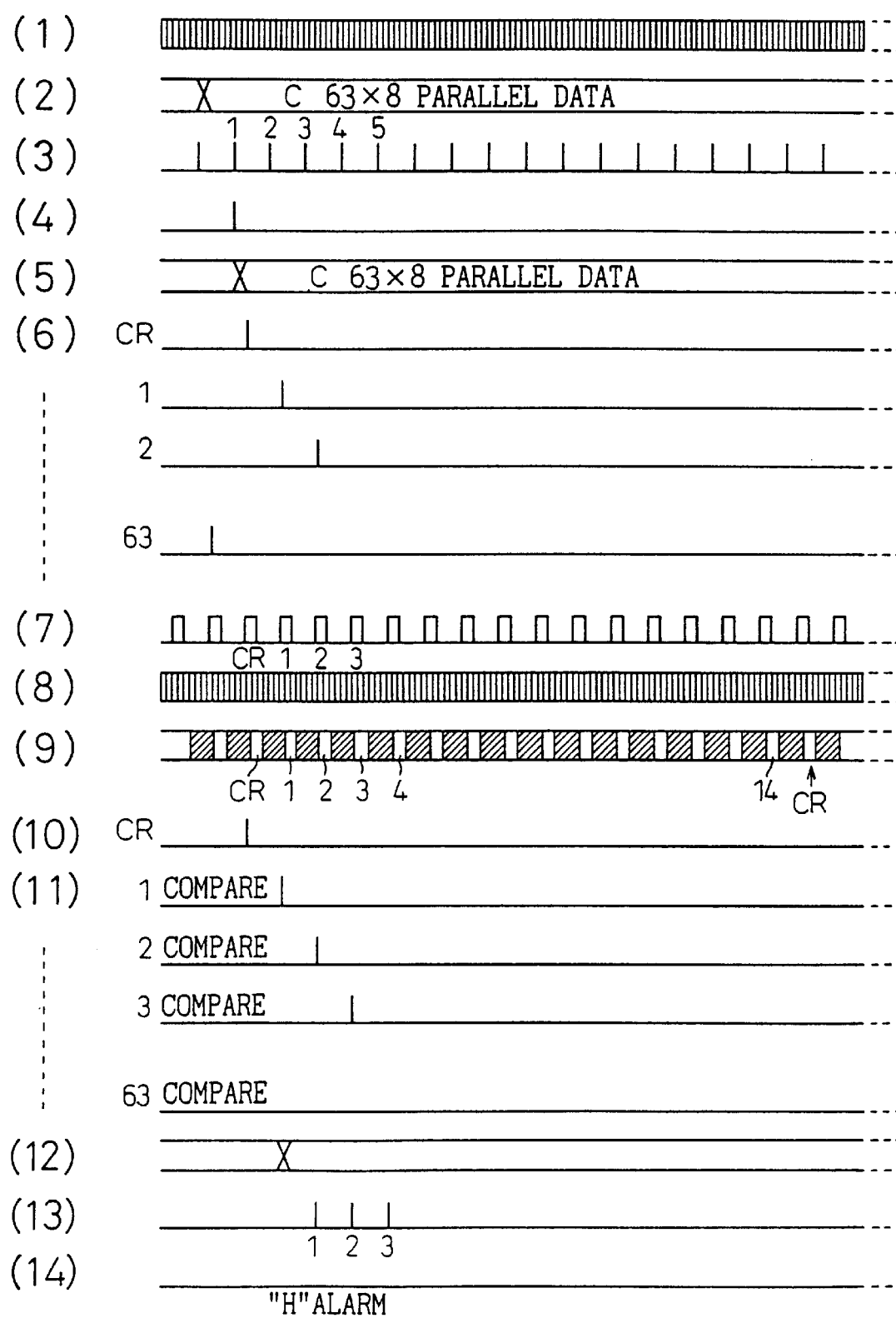
FIG. 10 is a first part of a timing chart of signals of major portions in FIG. 9.
Figure 11:
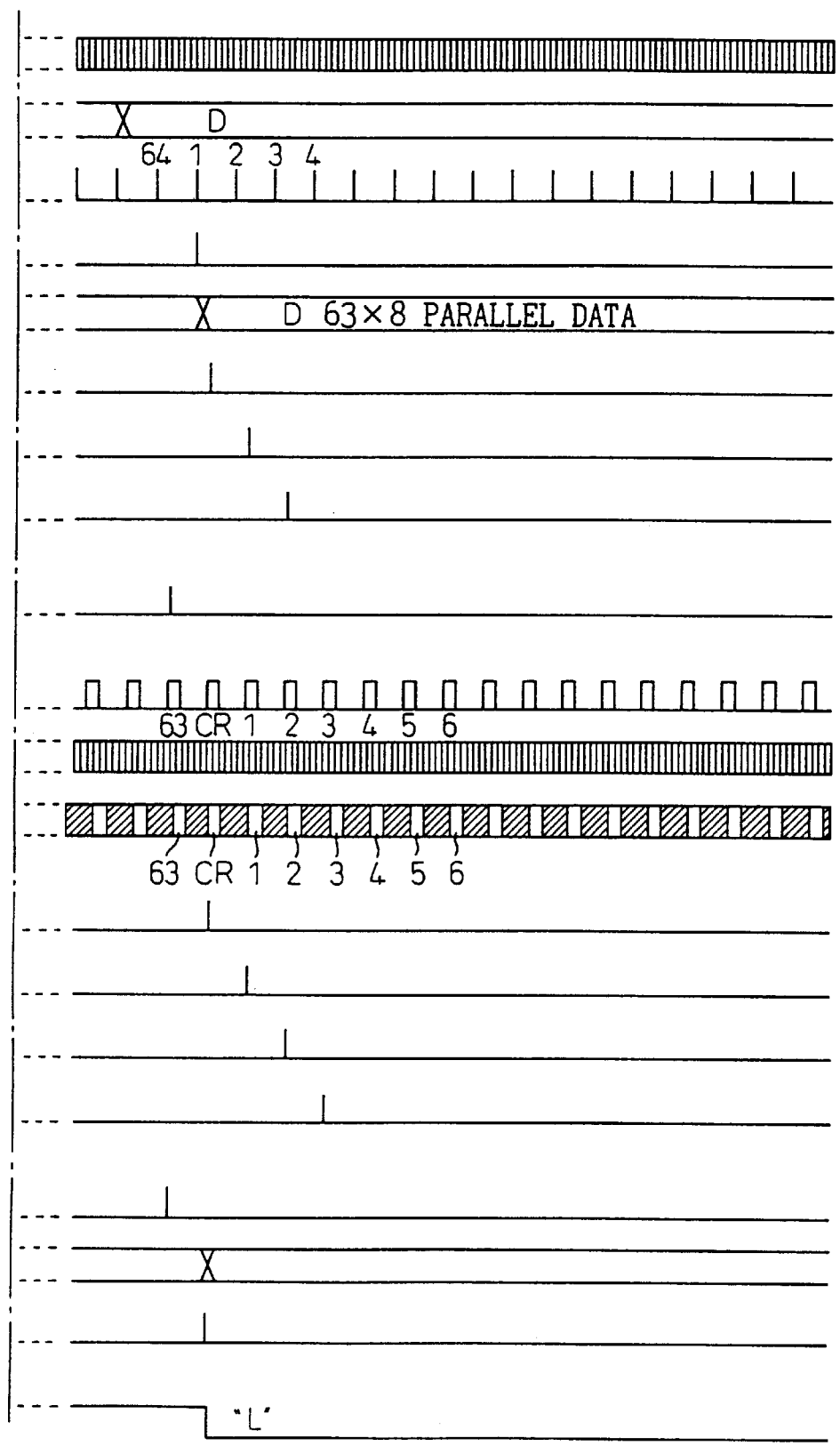
FIG. 11 is a second part of a timing chart of signals of major portions in FIG. 9.

FIG. 9 is a view of a pair of the sender side path trace check apparatus and the receiver side path trace check apparatus; and FIGS. 10 and 11 are parts of a timing chart of signals at major portions in FIG. 9.

Note that the above third embodiment of FIG. 7 is adopted as the receiver side path trace check apparatus $PT_r$ at the upper part of FIG. 9 and the above embodiment of FIG. 8 is adopted as the sender side path trace check apparatus $PT_s$ at the lower part of FIG. 9, therefore the explanation of those portions in FIG. 9 is omitted. Note that, a 63-sequence counter is used as the counter unit 77 on the receiver side.

Further, reference symbol F at the center of FIG. 9 represents the fiber transmission line. Path trace check apparatuses $PT_s$ in for example the nodes C, D, and A (note, only the node C is shown in FIG. 9) are connected to one end of this fiber transmission line F. while the path trace check apparatus $PT_r$ in for example the node B is connected to the other end. Note that both the electrical/optical (E/O) conversion unit and optical/electrical (O/E) conversion unit required for the connection with the fiber transmission line F are omitted in this figure.

Referring to FIG. 10 and FIG. 11, the parts designated by (1) to (7) at the left in FIG. 10 are timing charts of signals at major portions in the sender side path trace check apparatus $PT_s$, while the parts designated by (9) to (14) at the left are timing charts of signals at major portions in the receiver side path trace check apparatus $PT_r$. Note that the parts (1) to (14) in FIG. 10 and FIG. 11 correspond to the signals at (1) to (14) in FIG. 9., The signal of part (1) of FIG. 10 and FIG. 11 is the output signal from the microcomputer ($\mu$-COM) 10, that is, the path trace data. This path trace data is the identification address of the node C according to the above example.

The signal of part (2) is the signal representing the path trace data detection output from the interface unit 81 receiving as its input the path trace data from the microcomputer. Note, this detection output signal is converted to eight sets of parallel data. Accordingly, it is a signal of 63 bits×8.

The signal of part (3) is the clock CLK from the main counter (not illustrated) for dividing the clock of the multiplex transmission data, that is, 10 Gbps, and is supplied to the frequency divider 83.

The signal of part (4) is a latch pulse output from the frequency divider 83 and is supplied to the latch unit 82.

The signal of part (5) is the output from the latch unit 82 driven by the latch pulse and is obtained by holding the detection output signal from the interface unit 81 (the signal of part (2)) for a predetermined period (one frame). This latched signal is input to the path trace data inserting means 42.

The signal of part (6) is a series of insertion pulses to be applied to the path trace data inserting means 42 from the frequency divider 83. Initial insertion pulse is for inserting the carriage return code CR (specific code). This is followed by the insertion pulses 1, 2, 3, . . . to 63 for successively inserting the path trace data from the latch unit 82. Note that, if for example the insertion pulses 1, 2, 3, . . . , 14 are sufficient for completely inserting the path trace data, the carriage return code CR may be inserted again at the insertion pulse 15 (see (9)). If the first carriage return code CR is the start flag of the path trace data, the last carriage return code CR is the end flag of the related path trace data. Each path trace data is sandwiched by first and last carriage return codes and transmitted under the start-stop synchronization method.

The signal of part (7) is the output signal from the path trace data inserting means 42 to be multiplexed by the insertion pulse. This output signal is placed at a predetermined position of the path data and is further multiplexed in the received multiplex transmission data $TD_r$ at the overhead inserting means 44.

The signal of part (8) indicates the sent multiplex transmission data TD, obtained by the above multiplexing, that is, the signal on the fiber transmission line F, and is forwarded to the node B.

The signal of part (9) is the signal received at the receiver side path trace check apparatus $PT_r$ in the node B and is obtained by extracting the overhead data at the overhead extracting means 31 and transforming it to path data. This signal is represented by alternate black and white patterns. The white pattern signal is the part required in the node B, and the black pattern signal is a signal not related to this node B.

The signal of part (10) is the signal representing the carriage return code CR (specific code) detected by the specific code (CR) detecting means 32.

The signal of part (11) is a signal representing the comparison pulses 1, 2, 3, . . . , 63 generated by the comparison pulse generating unit 76 according to the detected CR of part (10) described above.

The signal of part (12) is the signal output from the latch unit 82 by the detected CR of part (10) described above. This signal is the expected value of the path trace data which is designated by the microcomputer ($\mu$-COM) 10 and held at the latch unit 82 via the interface unit 81.

The signal of part (13) is the signal from the comparing unit 75, that is, a signal indicating the result of the comparison of the expected value of the path trace data and the actual path trace data obtained from the overhead extracting means 31 according to each comparison pulse of part (11). This signal becomes a signal of the "H" (or "L") level only when the two coincide and is the "L" (or "H") level when the two do not coincide.

The signal of part (14) is the output signal from the counter unit 77 comprising the 63-sequence counter and indicates the result of the comparison. In the figure, an example when noncoincidence occurs is represented by the "H" level (alarm). The "L" level represents the case where the data is determined to be normal path trace data.

As explained above, according to the present invention, it becomes possible to realize a path trace check apparatus (i) reducing the load of the microcomputer, (ii) raising the speed of the path trace check, and (iii) facilitating handling of an increase of nodes in comparison with the related art.

What is claimed is:

1. A method for a path trace check comprising:
    a first step of extracting overhead data from received multiplex transmission data and transforming this to path data;
    a second step of detecting a specific code placed in said path data;
    a third step of holding an expected value of path trace data indicating a route of transfer of the related multiplex transmission data designated from an external portion for a predetermined period at a timing of detection of said specific code; and
    a fourth step of comparing each of the actual path trace data successively extracted from said path data and the expected value of said path trace data corresponding to each path trace data according to the timing of detection of said specific code and determining coincidence between the two.

2. A method for a path trace check comprising:
    a first step of outputting an identification address of the related path trace check apparatus in a network as path trace data;
    a second step of inserting said path trace data at a predetermined position in the path data to be transmitted to said network together with a specific code indicating at least a timing of start of the path trace data;
    a third step of generating a path trace data insertion pulse synchronized with a clock of multiplex transmission data transferred in said network in order to determine the predetermined position in said path data; and
    a fourth step of placing said specific code and said path trace data in said path data and transmitting the same to said network.

3. A method for a path trace check according to claim 1, wherein:
    said first step contains a step of holding said transformed path data for a predetermined period and
    said fourth step is for successively reading said actual path trace data from said path data held for a predetermined period and comparing each of them with the expected value of said path trace data corresponding to each.

4. A method for a path trace check according to claim 1 or 2, wherein a code which is defined in an international standard as a character code, but does not appear as said path data is selected as said specific code.

5. An apparatus for a path trace check comprising:
    an overhead extracting means for extracting overhead data from received multiplex transmission data and transforming this to path data;
    a specific code detecting means for detecting a specific code placed in said path data;
    an expected value holding means for holding an expected value of path trace data indicating a route of transfer of the related multiplex transmission data designated from an external portion at a timing of detection of said specific code for a predetermined period; and
    a determining means for comparing, according to the timing of detection of said specific code, each of actual path trace data successively extracted from said path data and the expected value of said path trace data corresponding to each path trace data and determining coincidence between the two.

6. An apparatus for a path trace check according to claim 5, wherein said expected value holding means is constituted by:
    an expected value detection unit for detecting the expected value of said path trace data indicating the route of transfer of the related multiplex transmission data designated from the external portion and
    a latch unit for holding the expected value of the path trace data detected by the expected value detection unit at the timing of detection of said specific code.

7. An apparatus for a path trace check according to claim 6, wherein said determining means comprises:

a memory unit for writing said path data from said overhead extracting means;

an address generating unit for generating a read address for successively reading said path trace data from said path data written in said memory unit according to a detection timing signal of said specific code from said specific code detecting means, and applying this to the memory unit; and a comparing unit for detecting coincidence between the path trace data read from said memory unit and the expected value of said path trace data output from said latch unit.

8. An apparatus for a path trace check according to claim 6, wherein said determining means comprises:

a serial/parallel conversion unit for inputting said path data from said overhead extracting means;

a timing pulse generating unit for generating a timing pulse for successively converting just each said path trace data from serial data to parallel data and then holding the same for a predetermined period from said path data input to said serial/parallel conversion unit according to the detection timing signal of said specific code from said specific code detecting means and applying the same to the serial/parallel conversion unit; and a comparing unit for detecting coincidence between each path trace data output from said serial/parallel conversion unit and the expected value of each said path trace data output from said latch unit.

9. An apparatus for a path trace check according to claim 6, wherein said determining means comprises:

a comparing unit for receiving the expected value of each path trace data output from said latch unit as the first comparison input and receiving as its input said path data from said overhead extracting means;

a comparison pulse generating unit for generating a comparison pulse for selecting just each path trace data from said path data input, as the second comparison input, to said comparing unit according to the detection timing signal of said specific code from said specific code detecting means and applying the same to the comparing unit; and a counter unit for monitoring the continuity of coincidences of the two based on the result by successively comparing said first and second comparison inputs with each said comparison pulse.

10. An apparatus for a path trace check comprising:

a path trace data outputting means for outputting an identification address of a related path trace check apparatus in a network as path trace data;

a path trace data inserting means for inserting said path trace data at a predetermined location in the path data to be transmitted to said network together with a specific code indicating at least the timing of start of the path trace data;

an insertion pulse generating means for generating a path trace data insertion pulse synchronized with a clock of the multiplex transmission data transferred in said network and applying this to said path trace data inserting means; and an overhead inserting means for placing said specific code and said path trace data from said path trace data inserting means in said path data and transmitting the same to said network.

11. An apparatus for a path trace check according to claim 10, wherein said path trace data outputting means comprises:

an interface unit for detecting said path trace data from the microcomputer and a latch unit for holding the detection output from said interface unit for a predetermined period.

12. An apparatus for a path trace check according to claim 11, wherein said insertion pulse generating means comprises a frequency divider for dividing the frequency of the clock synchronized with the clock of said multiplex transmission data and drives said latch unit by the output of the frequency divider.

13. An apparatus for a path trace check according to claim 10, wherein a code which is defined in an international standard as a character code, but does not appear as said path data is selected as said specific code.

14. An apparatus for a path trace check according to claim 5 or 13, wherein said specific code is a carriage return code.

15. An apparatus for a path trace check according to claim 1 or 2, wherein said path trace data is used as a J1 byte in an STS-1 frame format.

16. An apparatus for a path trace check according to claim 1 or 2, wherein said path trace data is used as a J2 byte in a VT1.5 frame format.

* * * * *